US006679412B1

United States Patent
Thomas et al.

(10) Patent No.: US 6,679,412 B1
(45) Date of Patent: Jan. 20, 2004

(54) STABILIZING MAGAZINE FOLLOWER FOR FASTENER DRIVING TOOL

(75) Inventors: Louis Thomas, Maywood, IL (US); Kevin M. Tucker, Chicago, IL (US)

(73) Assignee: Illinois Tool Works Inc., Glenview, IL (US)

(*) Notice: Subject to any disclaimer, the term of this patent is extended or adjusted under 35 U.S.C. 154(b) by 1 day.

(21) Appl. No.: 10/223,517

(22) Filed: Aug. 19, 2002

(51) Int. Cl.[7] ............................................. B25C 1/04
(52) U.S. Cl. ...................... 227/119; 227/120; 227/136
(58) Field of Search ................................ 227/119, 120, 227/135, 136, 109

(56) References Cited

U.S. PATENT DOCUMENTS

| 5,813,588 | A | * | 9/1998 | Lin | 227/120 |
| 6,176,412 | B1 | | 1/2001 | Weinger et al. | |
| 6,267,284 | B1 | * | 7/2001 | Clark | 227/119 |
| 6,431,430 | B1 | * | 8/2002 | Jalbert et al. | 227/136 |
| 6,499,642 | B1 | * | 12/2002 | Amada | 227/120 |
| 6,592,014 | B2 | * | 7/2003 | Smolinski | 227/136 |
| 6,612,476 | B2 | * | 9/2003 | Smolinski | 227/120 |
| 6,629,360 | B2 | * | 10/2003 | Ohuchi | 227/136 |

* cited by examiner

*Primary Examiner*—Scott A. Smith
(74) *Attorney, Agent, or Firm*—Lisa M. Soltis; Mark W. Croll; Donald J. Breh

(57) ABSTRACT

A fastener driving tool is provided having a housing with an axis, the housing enclosing a piston having a driver blade, a nosepiece associated with the housing and extending in the axial direction, the nosepiece having a barrel for accepting a fastener and for axially guiding the driver blade toward impact with the fastener, a magazine associated with the nosepiece for feeding a collation strip of fasteners to the barrel of the nosepiece, and a magazine follower slidably mounted on the magazine for biasing the collation strip of fasteners toward the nosepiece, the magazine follower having a profile, and wherein the collation strip includes an extension having a profile that complements the profile of the magazine follower.

20 Claims, 3 Drawing Sheets

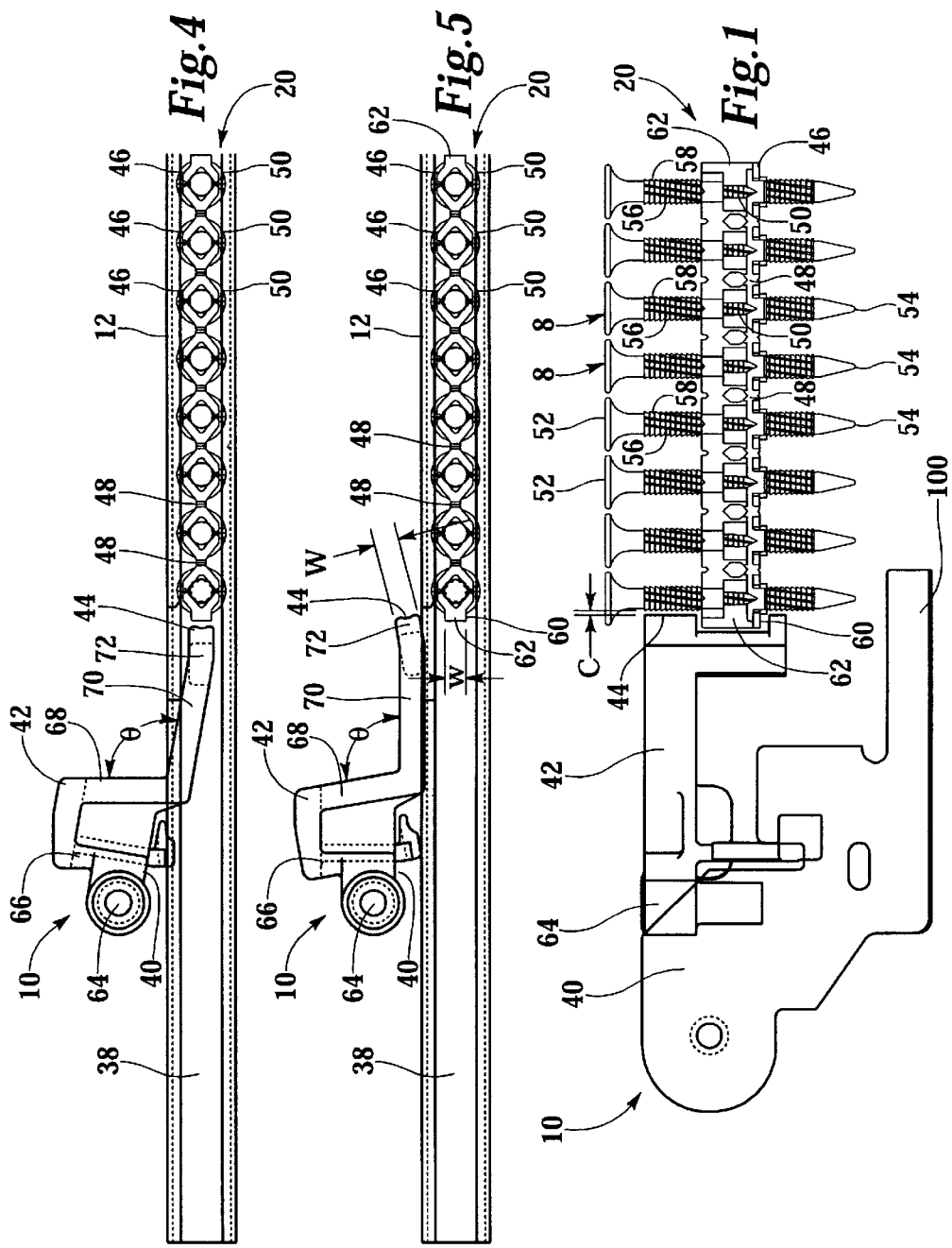

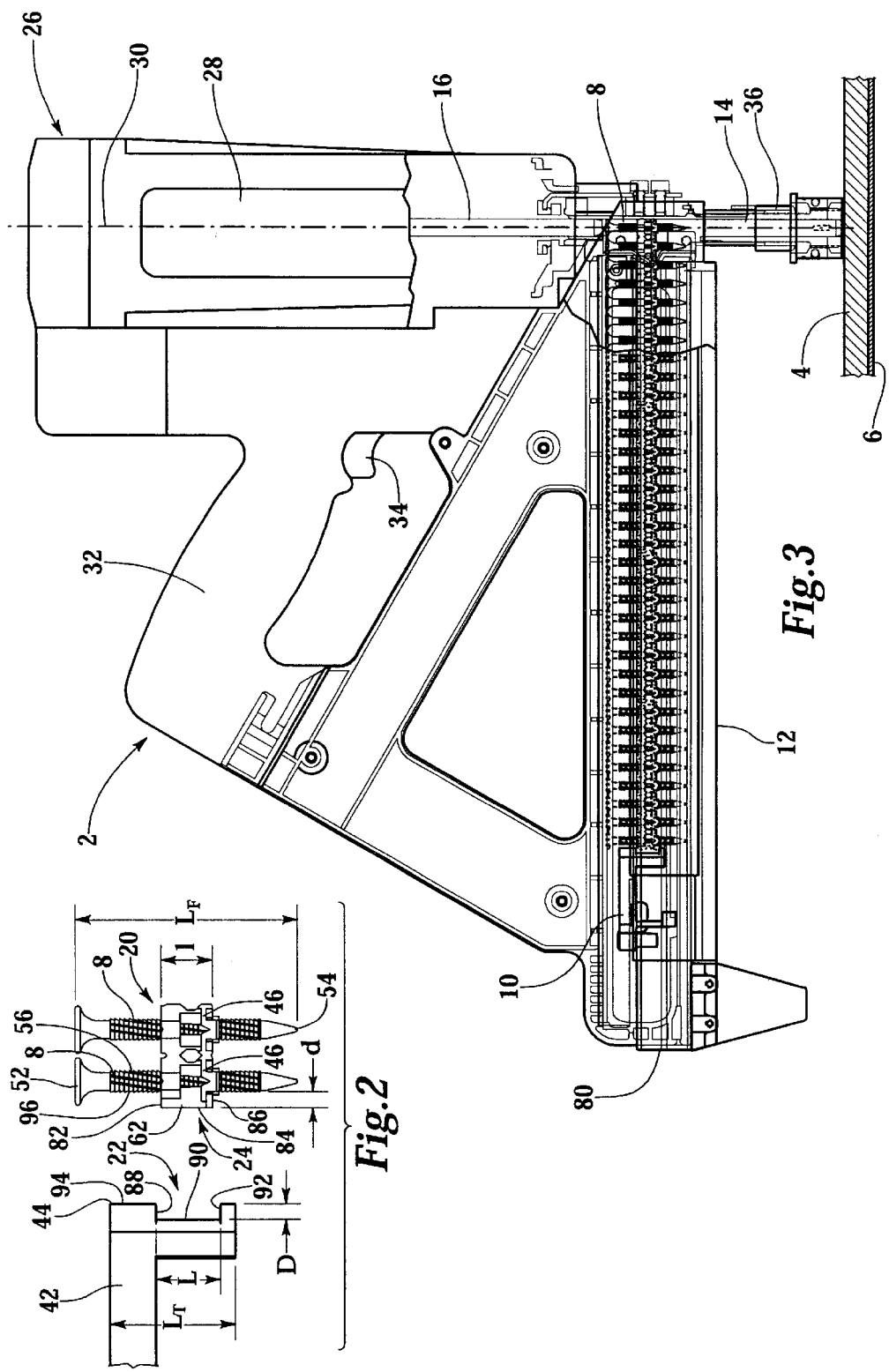

STABILIZING MAGAZINE FOLLOWER FOR FASTENER DRIVING TOOL

BACKGROUND OF THE INVENTION

1. Field of the Invention

The present invention is directed to a magazine follower portion for a fastener driving tool.

2. Description of the Related Art

Many fastener driving tools include a magazine for feeding a collation strip of fasteners to a nosepiece of the tool. Many of the collation strips used in fastener driving tools include a plurality of sleeves that are connected in series, wherein the leading sleeve and fastener can break away from adjacent sleeves when the tool drives the leading fastener. Examples of fastener collation strips are taught in the commonly assigned U.S. Pat. No. 5,069,340 to Ernst et al. and U.S. Pat. No. 5,931,622 to Gupta et al., the disclosures of which are incorporated herein by reference.

Many fastener driving tools incorporate a magazine to feed the fasteners and also include a magazine follower to bias the collation strip toward the nosepiece so that when one fastener is driven, the remaining fasteners will be pushed towards the nosepiece so that the next fastener is in a position to be driven. An example of a magazine follower is taught in the commonly assigned U.S. Pat. No. 6,176,412 to Weinger et al., the disclosure of which is incorporated herein by reference.

Prior magazine followers have been known to cause the collation strip to bend slightly so that the fasteners become angled in relation to each other and so that the collation strip is slightly skewed as it is pushed by the magazine follower. In some cases, this bending, also known as "jacking," can break one of the sleeves of the collation strip off which can cause jamming of the fastener driving tool.

What is needed is a magazine follower that will stabilize the trailing end of the collation strip of fasteners within the magazine and ensure that the collation strip is fed through the magazine in the proper orientation by the magazine follower.

BRIEF SUMMARY OF THE INVENTION

In accordance with the present invention, a fastener driving tool is provided. The fastener driving tool includes a housing having an axis, the housing enclosing a piston having a driver blade, a nosepiece associated with the housing and extending in the axial direction, the nosepiece having a barrel to accept a fastener and to axially guide the driver blade toward impact with the fastener, a magazine associated with the nosepiece for feeding a collation strip of fasteners to the barrel of the nosepiece, and a magazine follower slidably mounted on the magazine for biasing the collated strip of fasteners toward the nosepiece, the magazine follower having a profile, wherein the collated strip of fasteners includes an extension having a profile that complements the profile of the magazine follower.

Also in accordance with the present invention, a fastener driving tool is provided for driving a fastener into a substrate. The fastener driving tool includes a housing having an axis, a nosepiece connected to the housing and extending axially away from the housing, a magazine associated with the nosepiece for feeding a collation strip of fasteners to the nosepiece, wherein the collation strip of fasteners has a trailing end, the collation strip having a profile at the trailing end, and a magazine follower for biasing the collation strip of fasteners toward the nosepiece, the magazine follower having a profile that complements the profile of the collation strip of fasteners.

These and other objects, features and advantages are evident from the following description of an embodiment of the present invention, with reference to the accompanying drawings.

BRIEF DESCRIPTION OF THE SEVERAL VIEWS OF THE DRAWINGS

FIG. 1 is a side view of a magazine follower and a collation strip of fasteners.

FIG. 2 is an exploded side view of the magazine follower and the collation strip of fasteners.

FIG. 3 is a partially cut away side view of a fastener driving tool.

FIG. 4 is a top view of a magazine for the fastener driving tool, with the magazine follower being in a first position.

FIG. 5 is a top view of the magazine with the magazine follower being in a second position.

DETAILED DESCRIPTION OF THE INVENTION

Figure 6:
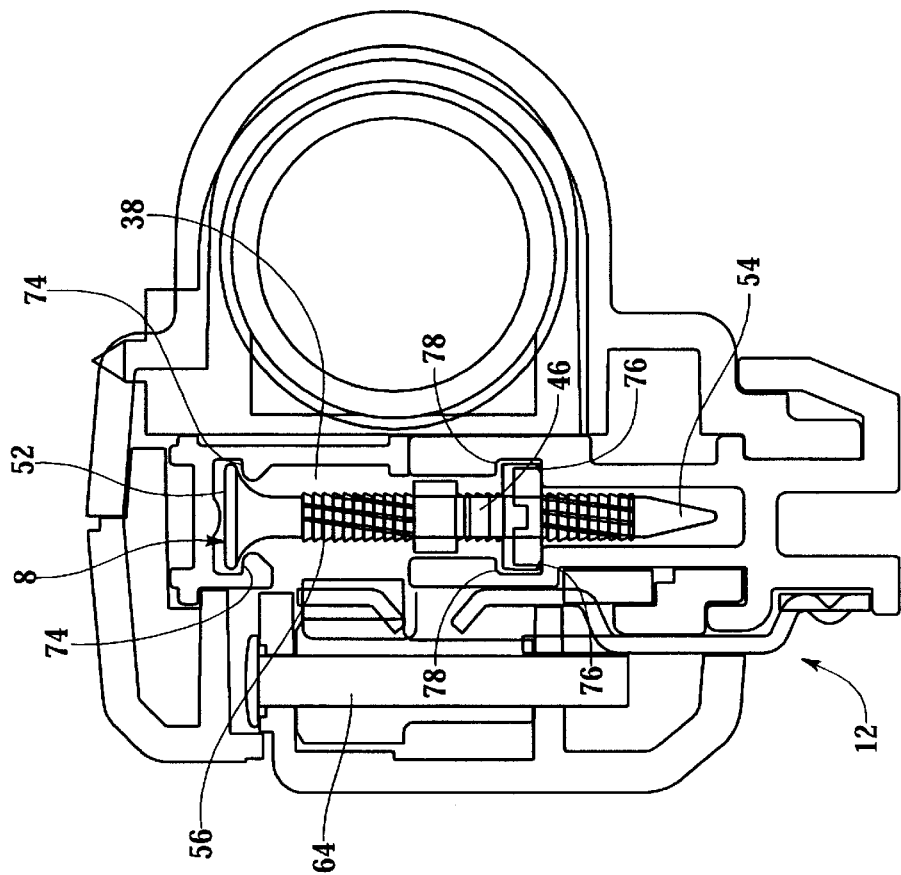
FIG. 6 is a sectional view of the magazine showing the collation strip within a channel of the magazine.

A novel and inventive fastener driving tool 2 is shown in the figures. Tool 2 includes a novel and inventive magazine follower 10 for biasing a collation strip 20 of fasteners 8 through a magazine 12 of tool 2. Magazine follower 10 creates a force against collation strip 20 to push collation strip 20 of fasteners 8 along magazine 12 to feed fasteners 8 into a barrel 14 of tool 2 before driving fasteners with a piston driving rod 16. Magazine follower 10 also includes a novel profile 22, which corresponds to a profile 24 of collation strip 20. The matching profiles of magazine follower 10 and collation strip 20 provide greater stability of collation strip 20 within magazine 12.

Tool 2 includes a chassis 26 having a housing 28 for enclosing a piston (not shown) having a piston driving rod 16. Chassis 26 is generally cylindrical in shape and has a central axis 30 running through the length of tool 2. Tool 2 uses a power source for creating a driving force to drive the piston in the driving direction. Examples of power sources include pneumatic power using compressed air to drive the piston, gasoline combustion powered using ignited gasoline, and powder actuated tools using explosive powder to drive the piston. A handle 32 radially extends away from chassis 26 and includes a trigger 34 for actuating tool 2. Also included in tool 2 is a nosepiece 36 coupled to housing 28 and axially extending away from housing 28 in the driving direction. The piston, driving rod 16 and nosepiece 36 are also generally cylindrical in shape having the same central axis 30 as chassis 26. Nosepiece 36 includes a barrel 14 axially extending through the length of nosepiece 36 for accepting fasteners 8 and for guiding driving rod 16, also known as a driver blade, of the piston toward impact with fastener 8. A magazine 12 for feeding collation strip 20 is connected to nosepiece 36 and extends radially away from nosepiece 36. Magazine 12 includes a channel 38 for guiding collation strip 20 along the length of magazine 12 toward nosepiece 36.

Tool 2 provides for attachment of a substrate 4 to a support member 6 using fasteners 8. Substrate 4 could be one of several construction materials commonly attached to support structures of a building, an example being sheathing such as sheet rock and gypsum board, particle board, or plywood. Support member 6 could be one of several support structures used in the construction industry, including wooden support studs or thin to medium gauge steel framing studs.

Collation strip 20 is placed within channel 38 of magazine to feed collation strip of fasteners 8 to nosepiece 36. A spring biased magazine follower 10 is included for biasing collation strip 20 along channel 38 towards nosepiece 36. Magazine follower 10 includes a holder 40 and an engagement portion 42 having a leading end 44 with a profile 22 at leading end 44. Magazine follower 10 is biased towards nosepiece 36 by a spring (not shown) placed between magazine follower 10 and nosepiece 36 to pull magazine follower 10 along magazine 12. The spring provides a generally constant force against magazine follower 10 to bias collation strip 20 along channel 38. After a fastener 8 has been driven by tool 2, there is a vacant space in barrel 14. The spring pulls magazine follower 10, which in turn biases collation strip 20 so that the next sleeve 46 and fastener 8 are pushed into the vacancy in barrel 14 so that the next fastener 8 can be driven by tool 2. An example of a spring used to pull magazine follower 10 is a constant force spring made from 301 stainless steel having a thickness of about 0.1 inches, a width of about 0.375 inches and a length of about 15.8 inches, wherein the spring can provide generally constant force acting on magazine follower 10 of about 2.2 pounds-force.

As shown in FIG. 1, collation strip 20 includes a plurality of sleeves 46 for holding a plurality of fasteners. Sleeves 46 are connected in a row along a collation plane with at least one frangible bridge 48 between adjacent sleeves 46. Each sleeve 46 includes a body 50 that receives and surrounds an associated fastener 8 in order to hold associated fastener 8 in a predetermined orientation. In one embodiment, collation strip 20 is formed by injection molding, and fasteners 8 are inserted into each sleeve 46. Preferably, each sleeve 46 of collation strip 20 is designed so that it will split apart into two large pieces so that no portion of sleeve 46 will become trapped between head 52 of fastener 8 and substrate 4. An example of a preferred collation strip 20 is disclosed in the commonly assigned, co-pending patent application Ser. No. 10/224,998 filed contemporaneously herewith, the disclosure of which is incorporated herein by reference.

An exemplary fastener 8, shown in FIGS. 1 and 2 includes a head 52, a point 54, and a shank 56 axially extending between head 52 and point 54. In one embodiment, fastener 8 includes knurling 58 along the length of shank 56. Knurling 58 allows for higher pullout strength so that fastener 8 can provide better attachment between substrate 4 and support member 6. Shank 56 expands radially outward at head 52 in what is commonly referred to as a bugle configuration. A bugle head 52, such as the one shown in FIG. 1 also provides for higher pullout strength and prevents tearing of substrate 4 when fastener 8 is driven. Point 54 is preferably generally conical in shape except for a slightly rounded off tip. Examples of preferred fasteners 8 are disclosed in the commonly assigned U.S. Pat. No. 5,741,104 to Lat et al. and U.S. Pat. No. 5,749,692 to Kish et al., the disclosures of which is incorporated herein by reference.

At a trailing end 60 of collation strip 20 is an extension 62 which extends away from end sleeve 46 along the collation plane. Extension 62 has a profile 24 unique to end sleeve 46. Profile 22 of magazine follower 10 is complementary to profile 24 of extension 62 except that profile 22 of magazine follower 10 has a generally concave configuration, as if magazine follower profile 22 had been cut out of engagement portion 42, whereas profile 24 of collation strip 20 has a generally convex configuration so that profile 24 extends away from end sleeve 46 so that extension 62 can be nested within profile 22 of magazine follower 10, stabilizing collation strip 20 and biasing it straight along magazine 12. Complementary profiles 22 and 24 ensure that magazine follower 10 supports and stabilizes collation strip 20 while pushing collation strip 20 along magazine channel 38, preventing collation strip 20 from bending or "jacking," as described above.

Magazine follower 10 includes engagement portion 42 having profile 22, described below, and a holder 40, which support engagement portion 42 and provides guidance for magazine follower 10. Magazine follower 10 is laterally mounted to magazine 12, as shown in FIGS. 4 and 5, so that magazine follower 10 is slidable with respect to magazine 12. Holder 40 includes a guiding extension 100 that corresponds to a guide rail (not shown) along magazine 12. Engagement portion 42 is coupled to holder 40 by a pivot pin 64, so that leading end 44 of engagement portion 42 can be pivoted from a first position with profile 22 outside of magazine 12, as shown in FIG. 4, to a second position where profile 22 is inside magazine channel 38, as shown in FIG. 5. Engagement portion 42 has an angled cross section, as shown in FIGS. 4 and 5, to accommodate this pivoting.

In one embodiment, engagement portion 42 includes a pivot leg 66 coupled to holder 40 by pin 64, two angled legs 68 and 70 and a profile leg 72 on which profile 22 is located. Angled legs 68 and 70 orient profile leg 72 so that it is properly aligned along magazine channel 38, preferably so that profile leg 72 is essentially parallel to channel 38. Without proper orientation of profile leg 72, profile 22 would not bias collation strip 20 properly along magazine 12. Angled legs 68 and 70 are generally convex with respect to magazine 12, with an angle θ between leg 68 and leg 70 of between about 90° and about 110°, and preferably about 1000. Profile leg is also slightly angled with respect to leg 70 so that profile leg 72 is aligned generally parallel with magazine channel 38.

Engagement portion 42 of magazine follower 10 should be made out of a material that is strong enough to withstand the forces between the spring and collation strip 20 and should be substantially rigid to adequately support collation strip 20. A preferred material of construction of engagement portion 42 is SAE 8620 cast alloy steel hardened and tempered to a hardness of about 30 to about 40 Rockwell C, where the shape of engagement portion 42, particularly profile 22, is produced by investment casting. Holder 40 should also be made out of a resilient material, but does not have to be as rigid as engagement portion 42. An example of a suitable material of construction for holder 40 is also SAE 8620 cast alloy steel hardened and tempered to a hardness of about 30 to about 40 Rockwell C. Engagement portion 42 and holder 40 can also be plated to avoid corrosion. Preferred plating is electroless nickel having a thickness of between about 0.0003 inches and about 0.0005 inches.

Turning to FIG. 6, magazine 12 guides collation strip 20 along channel 38 so that each sleeve 46 that is fed into barrel 14 of nosepiece 36 is fed in a proper orientation. A cross section of channel 38 includes a unique shape that corresponds to the cross section of collation strip 20 and fasteners 8. Channel 38 includes several guiding surfaces, such as head guide 74 and sleeve guides 76 and 78 which keep fasteners 8 in the desired orientation. Each sleeve 46 and fastener 8 fit within channel 38 within a predetermined tolerance. Collation strip 20 is fed into trailing end 80 of magazine 12 through a feed opening (not shown). Magazine follower 10 is set at the first position so that engagement portion 42 is outside of magazine channel 38 to allow collation strip 20 to be pushed past magazine follower 10 toward nosepiece 36. Engagement portion 42 is then pivoted from the first position to the second position, so that magazine follower profile 22 is within channel 38 so that it can engage with collation strip 20.

In one embodiment, shown in FIG. 2, profile 24 of extension 62 of collation strip 20 is generally rectangular in shape having an upper surface 82, a side surface 84, and a lower surface 86. The length l of side surface 84 is the same as the length of each sleeve 46 of collation strip 20. Magazine follower profile 22 is also generally rectangular in shape and complements profile 24 of extension 62. Magazine follower profile 22 has a top surface 88, a side surface 90, and a bottom surface 92 corresponding to the upper surface 82, side surface 84, and lower surface 86, respectively, of extension 62.

The length L of magazine follower profile 22 is slightly larger than the length l of collation strip profile 24 so that extension 62 of collation strip will fit within magazine follower 10 within a predetermined tolerance. Engagement portion 42 of magazine follower 10 should have a total length $L_T$ that is shorter than the length $L_F$ of fastener 8. The clearance C between leading surface 94 of engagement portion 42 and an outer surface 96 of fastener shank 56 is preferred to be as close as possible, therefore the depth D of magazine follower profile 22 is chosen so that magazine follower 10 is close to fastener shank 56 within a predetermined tolerance. A close clearance C allows engagement portion 42 to support shank 56 and correct the alignment of fastener 8 if it becomes misaligned. The width W of engagement portion 42 is also slightly larger than the width w of extension 62 to ensure lateral stability of collation strip 20.

In one embodiment, the length $L_F$ of fastener 8 is about 1 inch, while the length l of extension 62 of collation strip 20 is about 0.34 inches. The total length $L_T$ of engagement portion 42 is about 0.83 inches and the length L of engagement portion profile 22 is about 0.425 inches. A total tolerance between top surface 88 of magazine follower profile 22 and upper surface 82 of extension 62 and between bottom surface 92 of magazine follower profile 22 and lower surface 86 of extension 62 is about 0.08 inches. In one embodiment, the depth D of magazine follower profile 22 is about 0.1 inches, the depth d of extension 62 from outer surface 96 of shank 56 to side surface 84 of extension 62 is about 0.12 inches, and the clearance C between outer surface 96 of shank 56 and leading surface 94 of engagement portion 42 is about 0.02 inches. The width W of engagement portion 42 is about 0.15 inches and the width w of extension 62 is about 0.12 inches.

As magazine follower 10 is biased by the spring to pull collation strip 20 along channel 38 toward nosepiece 36, side surface 90 of magazine follower 10 engages side surface 84 of extension 62 to push collation strip 20 toward nosepiece 36, while top surface 88 of magazine follower profile 22 engages with upper surface 82 of extension 62 and bottom surface 92 of magazine follower profile 22 engages with lower surface 86 of extension 62 to stabilize collation strip 20 while magazine follower 10 pushes collation strip 20 along magazine 12. As described above, the close clearance C between leading surface 94 of engagement portion 42 and shank 56, along with the stabilizing surfaces 88 and 92 of magazine follower 10 prevent end fastener and sleeve 46 from bending and shifting in relation to the rest of collation strip 20 within magazine 12 so that magazine follower 10 biases collation strip 20 in the proper direction, straight toward nosepiece 36.

Magazine follower 10 and collation strip 20 could have alternative profiles. The geometric shape of magazine follower profile 22 and collation strip profile 24 should complement each other, and the supporting surfaces of magazine follower 10 are important to prevent bending or jacking of collation strip 20.

Figure 7:
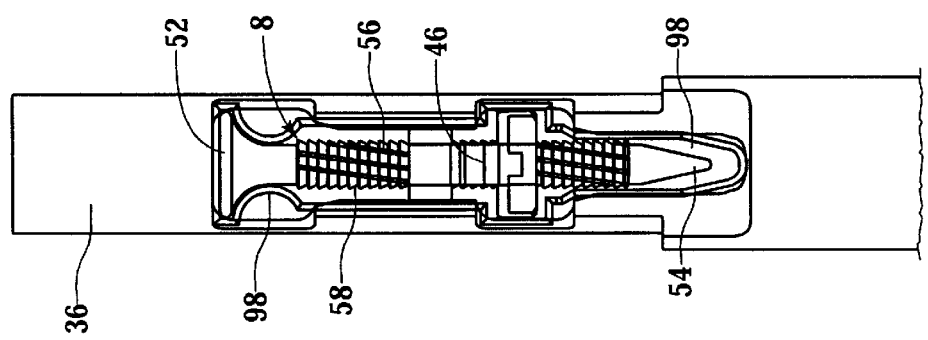
FIG. 7 is a sectional view of a nosepiece of a fastener driving tool showing an opening for feeding the collation strip to the nosepiece.

Turning to FIG. 7, an opening 98 in nosepiece 36 is included so that each sleeve 46 will be fed through nosepiece 36 into barrel 14 in the proper orientation. Opening 98 is shaped so that sleeve 46 and fastener 8 can only fit through in one orientation, so that if either sleeve 46 or fastener 8 is improperly aligned, sleeve 46 will not fit through opening 98. When sleeve 46 and fastener 8 are properly aligned they can pass through opening 98 into a barrel 14 in nosepiece 36.

When a sleeve 46 and fastener 8 are in barrel 14, tool 2 is ready to be actuated. Nosepiece 36 is connected to tool 2 so that it can be in an extended position and a retracted position relative to tool 2. Nosepiece 36 is biased toward the extended position and tool 2 is designed so that it cannot be actuated unless nosepiece 36 is in the retracted position so that tool 2 cannot be fired unless nosepiece 36 is pushed against substrate 4.

When nosepiece 36 is pushed into the retracted position, a fastener support (not shown) is also pushed upwards until the fastener support engages with fastener point 54, where it supports fastener 8 in a predetermined position. Once nosepiece 36 is fully retracted, tool 2 can be actuated, driving the piston in the driving direction until the piston eventually hits fastener head 52 and begins to drive fastener 8 and sleeve 46 in the driving direction. A shearing member (not shown) is also included in tool 2 that cleanly shears sleeve 46 from the rest of collation strip 20 as fastener 8 and sleeve 46 are driven into substrate 4. After tool 2 is actuated, fastener 8 is driven into substrate 4, and sleeve 46 breaks away from fastener 8. An example of a fastener support and a shearing member are disclosed in the commonly assigned patent application entitled "Telescoping Support Device For Fastener Driving Tool," having the ITW Case #13196, the disclosure of which is incorporated herein by reference.

Once the leading fastener 8 has been driven, there is an open space within barrel 14 for the next fastener 8 and sleeve 46. Due to the tension force created by the spring, which biases magazine follower 10 toward nosepiece 36, the next fastener 8 and sleeve 46 are pushed through opening 98 and into barrel 14 so that tool 2 is ready to be actuated again.

The present invention provides an improved and novel magazine follower having a unique, complementary profile to the unique profile of the collation strip being biased by the magazine follower. The matching profiles allow the magazine follower to support the collation strip, and prevent it from bending, breaking or jacking within the magazine of the fastener driving tool.

The present invention is not limited to the above-described embodiments, but should be limited solely by the following claims.

What is claimed is:

1. A fastener driving tool, comprising:
   a housing having an axis, the housing enclosing a piston having a driver blade;
   a nosepiece associated with the housing and extending in the axial direction, the nosepiece having a barrel to accept a fastener and to axially guide the driver blade toward impact with the fastener;

a magazine associated with the nosepiece for feeding a collation strip of the fasteners to the barrel of the nosepiece; and a magazine follower slidably mounted on the magazine for biasing the collated strip of fasteners towards the nosepiece, the magazine follower having a profile;

wherein the collated strip includes an extension having a profile that complements the profile of the magazine follower.

2. A fastener driving tool according to claim 1, wherein the profile of the magazine follower has a generally concave configuration.

3. A fastener driving tool according to claim 1, wherein the profile of the extension has a generally convex configuration.

4. A fastener driving tool according to claim 1, wherein the profile of the magazine follower is generally rectangular in shape.

5. A fastener driving tool according to claim 1, wherein the profile of the extension is generally rectangular in shape.

6. A fastener driving tool according to claim 1, wherein the profile of the magazine follower surrounds the extension of the collated strip.

7. A fastener driving tool according to claim 1, wherein the profile of the magazine follower engages the extension of the collated strip.

8. A fastener driving tool according to claim 1, wherein the magazine includes a channel for guiding the collation strip along the magazine.

9. A fastener driving tool according to claim 8, wherein the magazine follower is movable between a first position and a second position, wherein the profile of the magazine follower is outside of the channel when the magazine follower is in the first position and wherein the profile of the magazine follower is within the channel when the magazine follower is in the second position.

10. A fastener driving tool according to claim 1, wherein the profile of the magazine follower has a length of about 0.425 inches and a depth of about 0.1 inches.

11. A fastener driving tool according to claim 1, wherein the extension of the collated strip has a length of about 0.34 inches.

12. A fastener driving tool according to claim 1, wherein the tolerance between the length of the profile of the magazine follower and the length of the extension of the collated strip is about 0.8 inches.

13. A fastener driving tool according to claim 1, wherein the magazine follower has a leading surface, and wherein the clearance between the leading surface and a shank of a fastener is about 0.02 inches.

14. A fastener driving tool for driving a fastener into a substrate, comprising:

a housing having an axis;

a nosepiece connected to the housing and extending axially away from the housing;

a magazine associated with the nosepiece for feeding a collation strip of fasteners to the nosepiece;

wherein the collation strip of fasteners has a trailing end, the collation strip having a profile at the trailing end; and a magazine follower for biasing the collation strip of fasteners toward the nosepiece, the magazine follower having a profile that complements the profile of the collation strip of fasteners.

15. A fastener driving tool according to claim 14, wherein the trailing end of the collation strip of fasteners is nested within a leading end of the magazine follower so that the magazine follower stabilizes the collation strip of fasteners within the magazine.

16. A fastener driving tool according to claim 14, wherein the profile of the magazine follower has a generally concave configuration.

17. A fastener driving tool according to claim 14, wherein the profile of the collation strip has a generally convex configuration.

18. A fastener driving tool according to claim 14, wherein the profile of the collation strip is generally rectangular in shape.

19. A fastener driving tool according to claim 14, wherein the profile of the magazine follower is generally rectangular in shape.

20. A fastener driving tool according to claim 14, wherein the magazine follower biases the collation strip by engaging the trailing end of the collation strip.

\* \* \* \* \*